(12) United States Patent
Calinov et al.

(10) Patent No.: US 10,394,301 B2
(45) Date of Patent: Aug. 27, 2019

(54) PER-SCREEN ON SESSION POWER CONSUMPTION PROFILING

(71) Applicant: Microsoft Technology Licensing, LLC, Redmond, WA (US)

(72) Inventors: Iulian Calinov, Sammamish, WA (US); Sandeep Prabhakar, Bellevue, WA (US); Samarth Shah, Seattle, WA (US); Jihad Tafas, Redmond, WA (US); Zachary Sandburg Holmes, Redmond, WA (US); Tapan Ansel, Redmond, WA (US); Gabriel Knezek, Seattle, WA (US); Paresh Maisuria, Issaquah, WA (US); James Kennyth Truckle, Redmond, WA (US); Rahul Nair, Bellevue, WA (US); Taofiq Ezaz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 15/595,750

(22) Filed: May 15, 2017

(65) Prior Publication Data
US 2018/0329466 A1 Nov. 15, 2018

(51) Int. Cl.
*G06F 1/32* (2019.01)
*G06F 1/3206* (2019.01)
(Continued)

(52) U.S. Cl.
CPC .............. *G06F 1/3206* (2013.01); *G06F 1/26* (2013.01); *G06F 1/28* (2013.01); *G06F 1/3231* (2013.01)

(58) Field of Classification Search
CPC ....................... G06F 1/3206; G06F 1/3231
See application file for complete search history.

(56) References Cited

U.S. PATENT DOCUMENTS 6,983,225 B2    1/2006   Sprogis et al.
8,074,093 B1   12/2011   Johnson
(Continued)

FOREIGN PATENT DOCUMENTS

WO       2012004418 A2    1/2012

OTHER PUBLICATIONS

Walker, et al., "Accurate and Stable Run-Time Power Modeling for Mobile and Embedded CPUs", IEEE Transactions on Computer-Aided Design Integrated Circuits Systems, vol. 36, Issue 1, Dec. 2015, p. 1-14.

*Primary Examiner* — Stefan Stoynov
(74) *Attorney, Agent, or Firm* — Fountainhead Law Group P.C.

(57) ABSTRACT

Consumption of power by device components is profiled on a per-session basis of user interaction. A session engine determines start of a user interaction session with the device (e.g., by detecting screen turn on). The engine generates a session identifier (SID) and broadcasts same to device component(s). In response to the SID, the component(s) record power consumption data. Upon receiving a signal indicating end of the user interaction session (e.g., screen turn off), the session engine broadcasts a notice allowing component(s) to stop recording power consumption data. The components communicate aggregated data to the session engine for storage in a centralized location (e.g., trace buffer). In response to a query posed within a command line prompt, stored data may be parsed on a per-session basis for inclusion in a detailed report of power consumption. Power consumption inefficiencies endemic to components and/or user behaviors may be thus be identified and remediated.

20 Claims, 9 Drawing Sheets

(51) Int. Cl.
*G06F 1/3231* (2019.01)
*G06F 1/26* (2006.01)
*G06F 1/28* (2006.01)

(56) References Cited

U.S. PATENT DOCUMENTS

| | | | |
|---|---|---|---|
| 8,332,666 B2 * | 12/2012 | Boss | H02J 3/14 |
| | | | 713/300 |
| 8,392,734 B2 | 3/2013 | Blackburn et al. | |
| 8,839,036 B2 | 9/2014 | Rymeski et al. | |
| 8,965,718 B2 | 2/2015 | Zimmermann et al. | |
| 9,170,912 B1 * | 10/2015 | Hu | G06F 11/3062 |
| 9,342,522 B2 | 5/2016 | Gormer | |
| 9,459,678 B2 | 10/2016 | Lathrop et al. | |
| 2014/0244190 A1 | 8/2014 | Berman | |
| 2015/0269265 A1 | 9/2015 | Bennett | |
| 2015/0281756 A1 | 10/2015 | Soon-shiong et al. | |
| 2017/0017518 A1 * | 1/2017 | Wang | G06F 9/485 |
| 2017/0269678 A1 * | 9/2017 | Matsuo | G06F 1/3287 |

* cited by examiner

Report _500_

- Session Information (FIG. 5A) — 502
- Histogram #1 (FIG. 5B) — 504
- Histogram #2 (FIG. 5C) — 506
- Power Consumption Table (FIG. 5D) — 508

*FIG. 5*

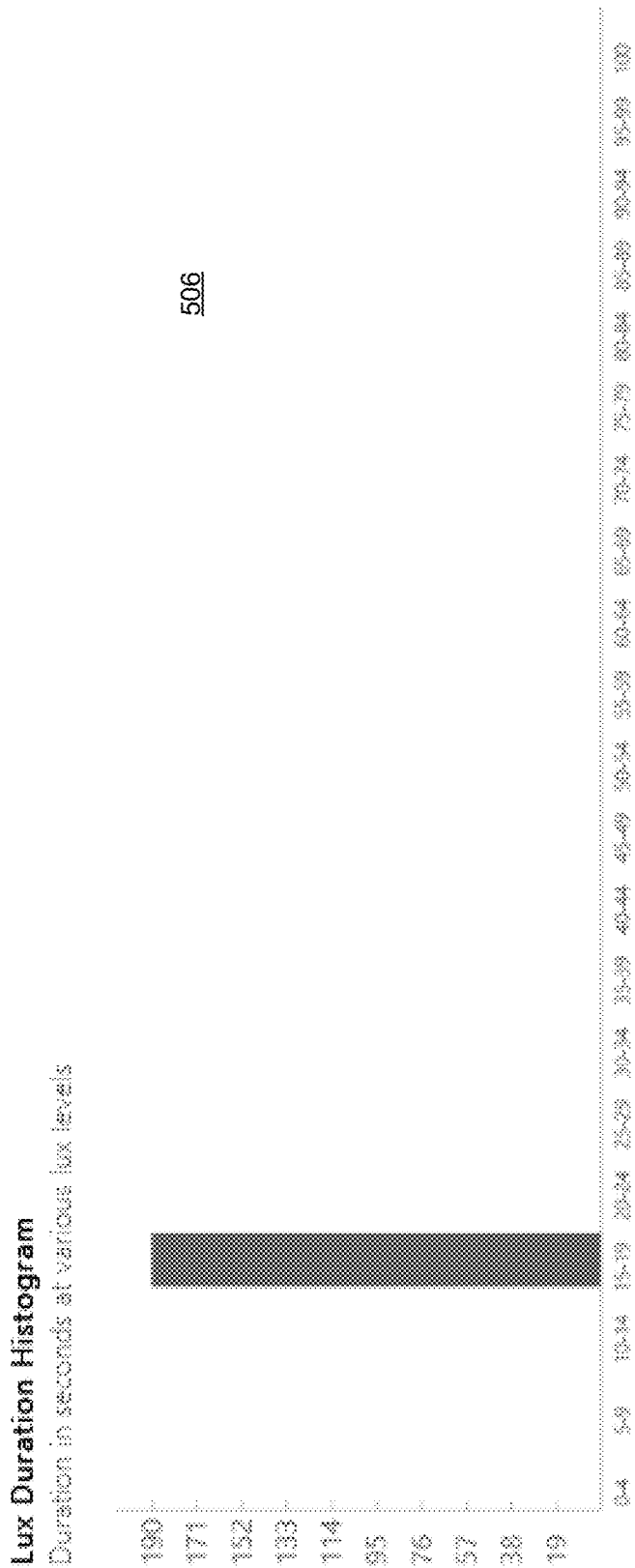

Srum Data
Data obtained from the SRUM database.
* in Power Estimation means the power value is from energy meter.
Otherwise it is from software model estimation.

+ Energy Meter

- Power Estimation

508

| APP ID | TOTAL (mW) | CPU (mW) | DISPLAY (mW) | DISK (mW) | MBB (mW) | NETWORK (mW) | SOC (mW) | LOSS (mW) | OTHER (mW) |
|---|---|---|---|---|---|---|---|---|---|
| \Device\HarddiskVolume3\Windows\System32\Csrshost.exe [samarths] | 367 | 1 | 365 | 0 | 0 | 0 | 0 | 0 | 0 |
| \Device\HarddiskVolume3\Windows\explorer.exe [samarths] | 138 | 33 | 104 | 0 | 0 | 0 | 0 | 0 | 0 |
| System [SYSTEM] | 128 | 30 | 0 | 45 | 0 | 51 | 0 | 0 | 0 |
| Microsoft.Windows.Cortana_1.9.0.16176_neutral_cx5n1h8yewy [samarths] | 65 | 32 | 27 | 2 | 0 | 4 | 0 | 0 | 0 |
| \Device\HarddiskVolume3\Windows\System32\SettingSyncHost.exe [samarths] | 59 | 57 | 0 | 0 | 0 | 1 | 0 | 0 | 0 |

*FIG. 5D*

PER-SCREEN ON SESSION POWER CONSUMPTION PROFILING

BACKGROUND

Mobile devices offer the benefits of portability and convenience, but may experience short battery life. One way of prolonging battery life may be to reduce or eliminate tasks that cause one or more device components to consume large amounts of battery power. However it can be difficult for a device user to determine precisely those tasks which are responsible for draining battery power, in order to take corrective action. Existing systems may allow mobile device users to manipulate power settings to reduce power, but require manual intervention and may not be personalized to the user.

SUMMARY

Embodiments allow profiling of power consumption by various components of a device, on a per-session basis of user interaction. A session engine determines the start of a user interaction session with the device (e.g., by detecting the screen turning on). Based upon this determination the session engine generates a session identifier (SID) and broadcasts that SID to the various device components. In response to receiving that SID, the components record power consumption data over time. Upon receiving a signal indicating the conclusion of a user interaction session (e.g., by detecting the screen turning off), the session engine broadcasts a notice to the components to allow them to halt recording of the power consumption data. The individual components then aggregate power consumption data recorded over the session, and ultimately communicate same to the session engine for storage in a centralized location (e.g., a trace buffer). Power consumption data may thus be stored in a detailed manner, on a per-session, per-component basis. In response to a user query (e.g., posed in a command line prompt), the stored data may be parsed on a per-session basis for inclusion in a detailed report (e.g., HTML) of power consumption.

Embodiments facilitate creating an extensible power consumption profiling system, wherein receipt of the broadcast session ID in a particular format, is sufficient to trigger power consuming component(s) to aggregate and transmit power consumption data on a per-session basis.

Particular embodiments may facilitate the identification and/or remediation of power consumption inefficiencies:
- endemic to operation of a particular component;
- arising from patterns of operation between related components (e.g., as dictated by particular hardware and/or software operational sequences);
- arising from common patterns of user behavior associated with utilization of hardware/software resources.

A further understanding of the nature and advantages of the embodiments disclosed herein can be realized by reference to the remaining portions of the specification and the attached drawings.

BRIEF DESCRIPTION OF THE DRAWINGS

FIGS. 5-5D show information which may be presented in a report according to an exemplary embodiment.

DETAILED DESCRIPTION

Figure 1:
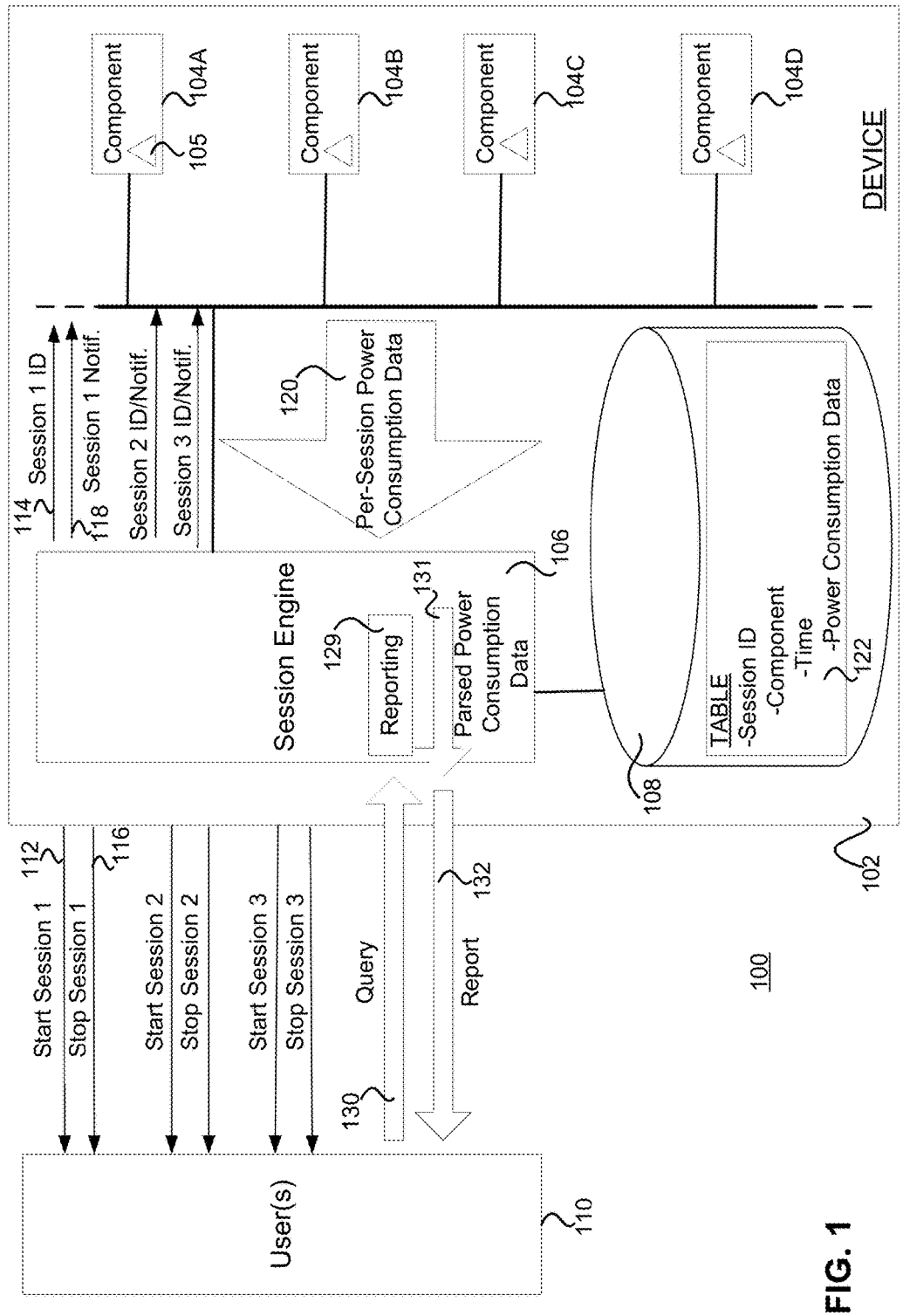
FIG. 1 depicts a simplified view of a system according to an embodiment comprising power consuming components.

In the following description, for purposes of explanation, numerous examples and details are set forth in order to provide an understanding of certain embodiments. It will be evident, however, to one skilled in the art that some embodiments can be practiced without some of these details, or can be practiced with modifications or equivalents thereof.

Embodiments relate to systems and methods allowing the consumption of power by component(s) of a device such as a smartphone, tablet, laptop, or other computing device, to be profiled on a per-session basis of user interaction. A session engine executed by the device determines start of a user interaction session with the device by detecting an event (e.g., a screen of the device turning on). The session engine generates a session identifier (SID) and broadcasts that SID to device components. In response to the SID, the components record power consumption data over time. Upon receiving a signal indicating end of the user interaction session (e.g., screen turn off), the session engine broadcasts a notice allowing the components to stop recording power consumption data. The components communicate aggregated data to the session engine for storage in a centralized location (e.g., trace buffer). In response to a query posed by a user (e.g., within a command line prompt), stored data may be parsed on a per-session basis for inclusion in a detailed report of power consumption.

One or more technical advantages may be achieved by performing power consumption profiling according to embodiments. First, rather than relying upon separate and distinct logging schemes coordinated between each individual component of the device, the collection of power consumption information is instead handled by the central engine broadcasting session start and stop notifications and session identifiers to all components. Trace information collected in a trace buffer is used as a basis for the power consumption profiling.

Another technical advantage offered by embodiments is extensibility. That is, receipt of the broadcast session ID in a particular format, is sufficient to trigger power consuming component(s) to aggregate and transmit power consumption data on a per-session basis.

Yet another technical advantage which may be achieved according to embodiments, is the ability to determine power consumption behavior for a plurality of device components. That power consumption activity is broken down across common user-interaction sessions, allowing comparison of the behavior of different device components during the same session.

Still another technical advantage that may be achieved according to embodiments, is the lightweight nature of the data collection and reporting. The session engine may operate in the background to collect and process the per-session power consumption data on an ongoing basis. Then, upon demand, a reporting element may offer access to data parsed on a per-session basis, in the form of an HTML report generated in response to a command line utility prompt.

FIG. 1 shows a simplified view of a system according to an embodiment. In particular, system 100 comprises device 102 including a plurality of power-consuming components 104A-D. Such components may be hardware or software in nature.

Examples of such power consuming hardware components can include input/output elements (e.g., display screen, touchscreen, keypad, speaker, etc.), processing components (e.g., CPU, graphics processors), communications buses, antenna(e), and others. Examples of power consuming software components can comprise software applications that are running to process data within the device, e.g., GUI software, word processing software, spreadsheet software, etc.

These device components are in broadcast communication with a central session engine 106. FIG. 1 further shows a data store 108 as also being in communication with the central session engine. According to some embodiments the data store may comprise a trace buffer.

The session engine is configured to receive and recognize certain interactions from the user 110 as indicating the start of a user interaction session with the device. For example, the session engine may detect a screen turn on event of the device as indicating the beginning of session of user interaction with the device.

Accordingly, FIG. 1 further shows a signal 112 to the session engine, indicating the start of a first user session. Upon receipt of this signal, the session engine is configured to generate a session identifier (SID) 114 indicating the commencement of that first user session, and to broadcast that SID to the device components.

In response to receiving the broadcast SID, the components are configured to consult internal logic 105, and begin recording power consumption data. The internal logic may determine the manner in which the particular component performs accounting for the power consumption data.

It is noted that the power consumption data may be aggregated by the device components from one or more different types of data stores. For example, the consumption of power by hardware components of the device may be available from one data store, while the consumption of power by software components (such as running applications) may be maintained in another data store.

FIG. 1 shows a signal 116 input to the session engine, indicating the end of the first user session. An example of such a signal could be the device screen turning off.

Upon receipt of this signal, the session engine is configured to generate a notification 118 indicating the conclusion of that first user session. That notification is then broadcast to the device components.

In response to this broadcast notification, the device components halt their collection of power consumption data. The device components may then aggregate the power consumption data according to the identifier of the session under which it was collected (here SID 1).

FIG. 1 further shows the initiation and conclusion of additional subsequent further user interaction sessions (e.g., 2, 3), accompanied by the session engine broadcasting session IDs and notifications to the device components.

At some time following the conclusion of each user interaction session, the device components are configured to communicate the aggregated per-session power consumption data 120 to the central session engine. This per-session power consumption data includes the corresponding relevant session ID. The power consumption data may be communicated by broadcasting from the component.

The sending of per-session power consumption data back to the session engine need not occur immediately following the conclusion of a particular session, nor even before the commencement of a new user interaction session. Such delayed reporting of aggregated per-session power consumption data can impart valuable flexibility to the circulation of data within the device. This eases the possibility of congestion as new user interaction sessions may be rapidly begun and then concluded in short succession.

Upon receiving the aggregated per-session power consumption data, the session engine directs the storage of that information within the data store. That storage may take the form of a table 122 with cells organizing the data according to dimensions comprising session identifier, component, time of data sampling, and the power consumption values themselves.

Next, FIG. 1 shows that a user 110 may seek to interrogate the per-session power consumption information present in the data store. Thus, the user may pose a query 130 to a reporting element 129 of the session engine. According to some embodiments, that query may take the lightweight form of a command entered via command line utility prompt.

In response to receiving the query, the reporting element of the session engine may parse the stored power consumption data according one or more of the stored dimensions (including but not limited to SID). Based upon the resulting parsed power consumption data 131, the reporting element of the session engine may then return a report 132 to the user, detailing the nature of the power consumption on a per-session, per-component basis. That report (which may be in the form of HTML), may offer valuable insight to the user regarding inefficient power consumption behaviors of individual users, individual components, and/or multiple components operating in coordination.

While the above description has indicated the reporting element as part of the session engine, this is not required. In certain embodiments the reporting element could comprise a separate processor that is in communication with the per-session data store to perform parsing and create reports of per-session power consumption activity for communication to a user.

And while the above description has indicated device screen turn on/off as determining session start/stop, this is not required. Certain embodiments may reference other types of user interactions to indicate the starting/stopping of sessions, including but not limited to:

switching between AC and DC power supply;
initialization;
cursor movement;
voice actuation;
receipt of signals across a computer network; and
others.

Moreover, it is not required that session start and stop signals be based upon a same type of user interaction (e.g., with a screen display, switching between AC/DC. According to some embodiments a session may be started based upon interaction with one device component (e.g., screen), with that same session ended based upon interaction with a different device component (e.g., closure of a software application).

Figure 2:
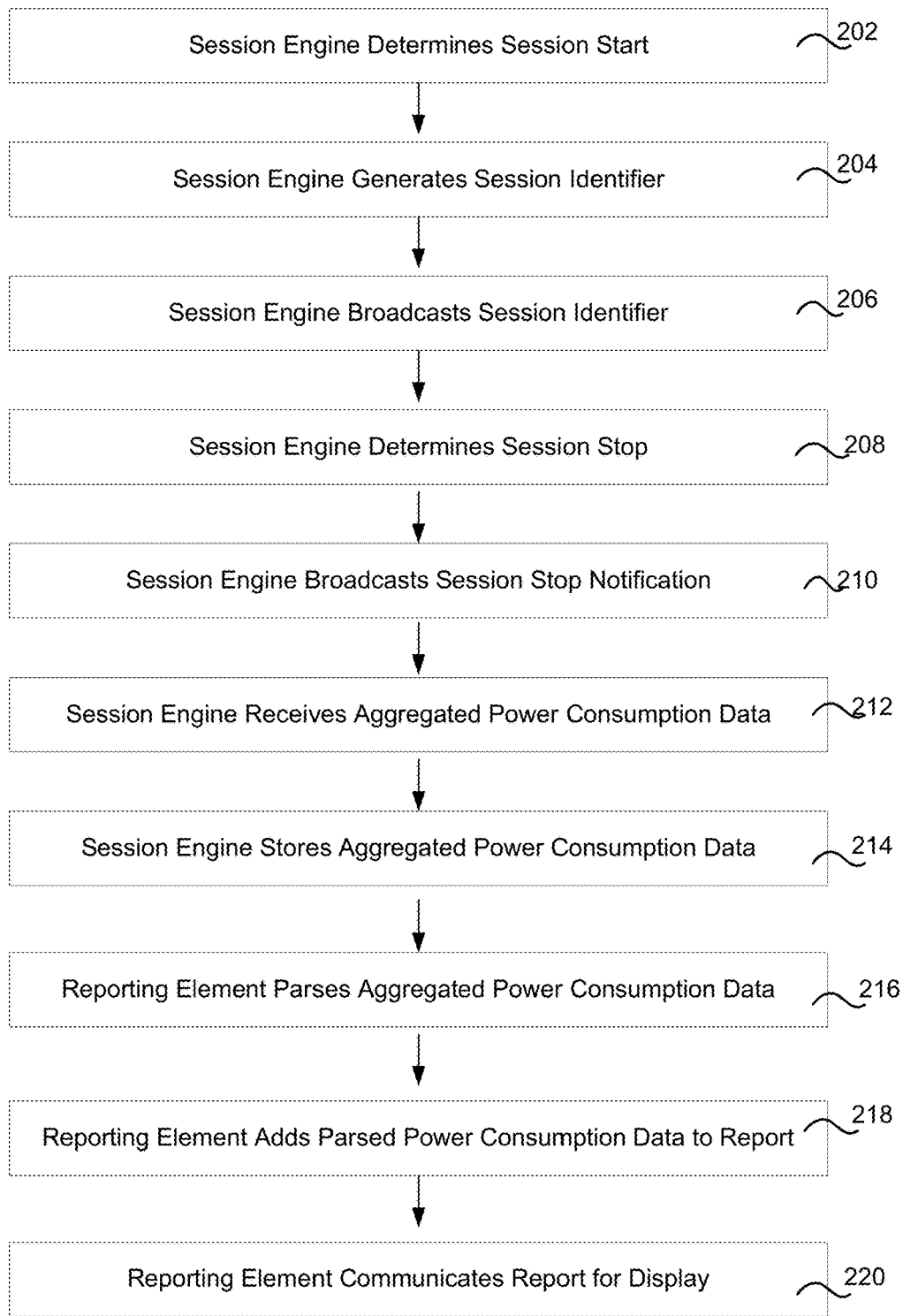
FIG. 2 depicts a simplified flow diagram of a method according to an embodiment.

FIG. 2 depicts a simplified flow diagram of a method 200 of power consumption profiling according to an embodiment. At 202, the session engine makes a first determination of the start of a user-interaction session with a device.

At 204, the session engine generates a session identifier based upon the first determination. At 206, the session engine broadcasts the session identifier for receipt by power consuming component(s) of the device. In certain embodiments those power consuming components may have registered to be part of a receiver group for the broadcast, thereby opting into the power consumption profiling framework being made available.

At 208, the session engine makes a second determination of the end of the user-interaction session. At 210, the session engine broadcasts a notification of the end of the session for receipt by the power consuming component(s).

At 212 the session engine receives aggregated power consumption data including the session identifier for the user interaction session, from the device component. At 214, the session engine stores the aggregated power consumption data together with the session identifier.

At 216 a reporting element may parse the stored aggregated power consumption data according to the session identifier. At 218 the reporting element may add the parsed power consumption data to a report. At 220 the reporting element communicates the report for display.

It is further noted that while the above description illustrates the aggregation and analysis of per-session power consumption activity for component(s) of a single device, embodiments are not limited to such environments. In particular, certain embodiments may harvest per-session data across a plurality of devices, in order to provide insight into inefficient power consumption behavior within a larger ecosystem.

Figure 3:
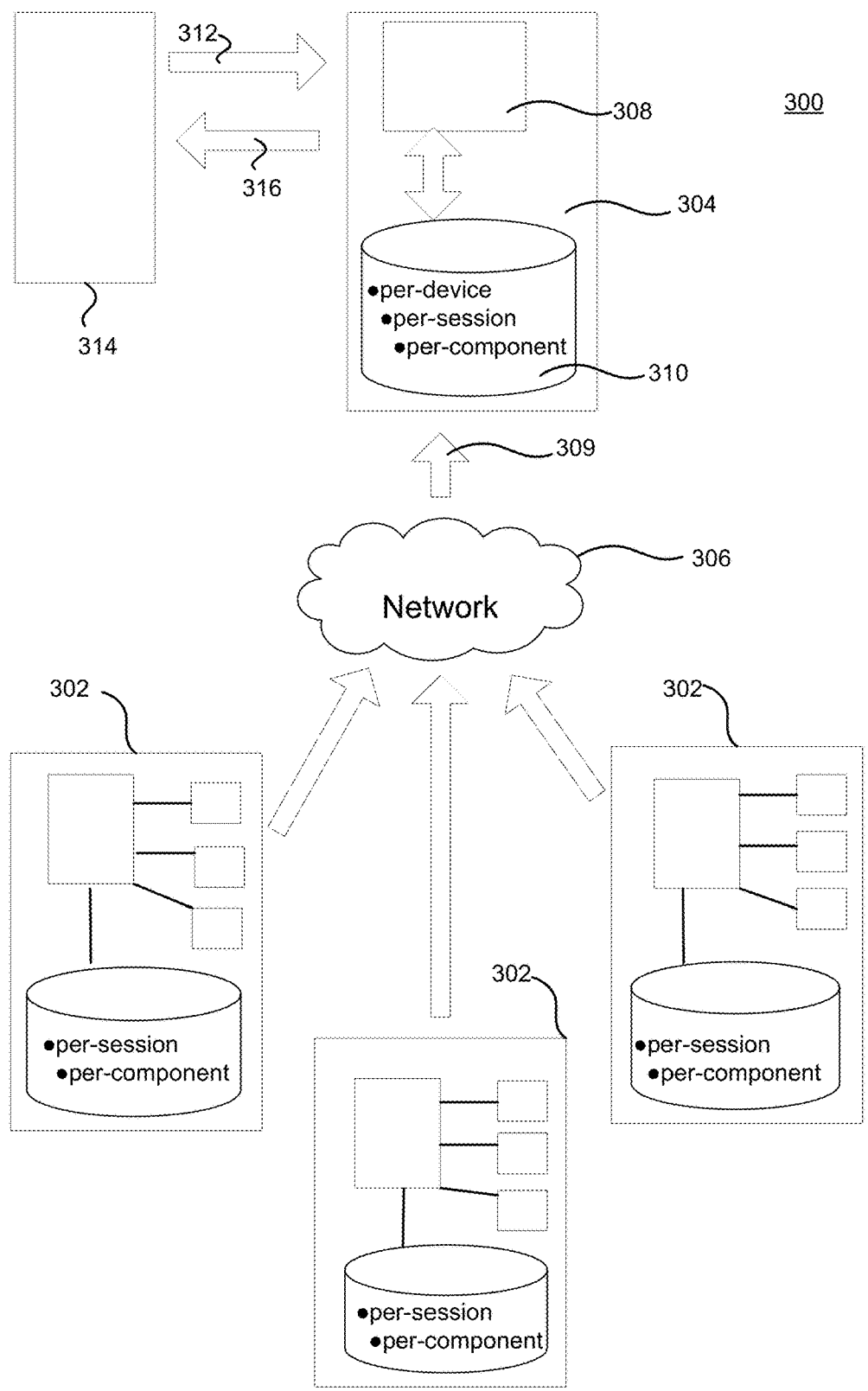
FIG. 3 depicts a simplified view of a system according to an embodiment.

For example, FIG. 3 shows a simplified view of a system 300 comprising a plurality of devices 302 in communication with a remote site 304 via a network 306. Analysis engine 308 may be configured to gather the per-session power consumption data 309 from the plurality of devices for organization and storage in a remote data warehouse 310. Such data may be pushed from the devices to the remote site (e.g., based upon a reporting schedule), or may be pulled from the devices to the remote site (e.g., based upon polling received).

Then, in response to queries 312 from a user 314, the analysis engine may analyze that global data to return recognized commonalities 316 (e.g., patterns) of inefficient power consumption between different devices and/or users.

In this manner, embodiments may thus be configured to recognize and/or remediate local inefficient power consumption characteristics endemic not only to specific device components and/or the behavior of particular users, but also inefficiencies arising from one or more of:
patterns of operation between related components (e.g., as dictated by intrinsic hardware/software operational sequences); and/or
common patterns or trends of user behavior (e.g., as dictated by intuitive user interaction to access hardware/software resources).

Example

An example is now illustrated in connection with collecting power consumption data in the context of the WINDOWS 10 operating system available from Microsoft Corporation of Redmond, Wash. Specifically the display screen component of a device may be configured to exhibit a particular brightness, depending upon ambient illuminance (LUX) detected by an optical sensor component of the device. For example, the screen may be brightened for a particular time period to compensate for high ambient light levels detected, thereby drawing more battery power.

Thus the power consumption profiling under such a scenario involves collecting per-session brightness data from the screen. That brightness information may then be compared with the corresponding per-session LUX data, in order to identify possible power consumption inefficiency.

Figure 4:
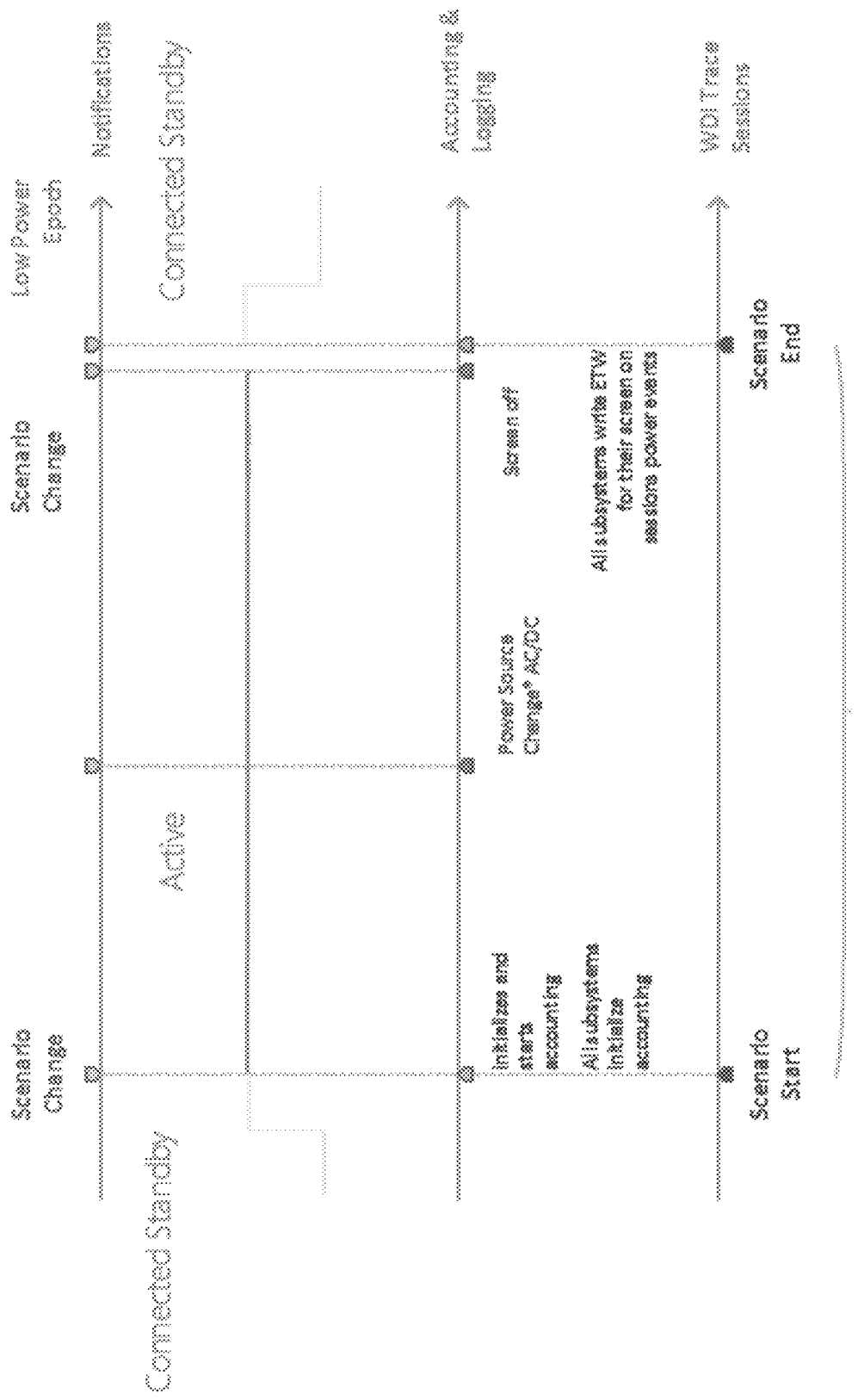
FIG. 4 provides an overview of the architecture for implementing an exemplary embodiment.

FIG. 4 provides an overview of the architecture for implementing a Screen On Study utilizing the Microsoft WINDOWS 10 operating environment. This architecture utilizes the Windows Diagnostics Infrastructure (WDI) and Event Tracing for Windows (ETW) functionality to provide the power consumption data used for profiling. The traces may be stored in a trace buffer. The power consumption data may take the form of extract, transform, and load (ETL) files.

FIG. 5 shows an overview of information which may be presented in a Screen On Study report 500 according to this example. Specifically, the initial section 502 of the report shown in FIG. 5A presents general information regarding a particular session, including start time, duration, energy change, change rate, and session identifier.

A second section 504 of the report offers a screen brightness histogram showing a duration in seconds at various screen brightness levels. A third section 506 of the report offers an illuminance (LUX) histogram showing a duration in seconds at various ambient illuminance levels.

These histograms from the report allow a user to correlate screen brightness data (e.g., as harvested from the device screen), with ambient illuminance (LUX) data (e.g., as collected from an optical sensor of the device), for a particular user interaction session. Here, analysis/comparison of this per-session brightness and LUX data may allow identifying inefficient power consumption behavior arising from interaction between device components (e.g., screen and optical sensor), thereby allowing the remediation of that behavior.

A final section 508 of the report presents a table of power consumption data for the session as obtained from the System resource usage monitor (Srum) database. Certain power consumption data may be taken from an energy meter, with other data estimated from a model.

Systems and methods implementing power consumption profiling according to various embodiments, may offer ease of use. For example the power consumption data may be accessible for profiling through a command line utility and may be shown in a simple HTML report.

Embodiments may be lightweight and thus allow for retrospective power consumption analysis on prior days without the user actually having to encounter a problem first before debugging that problem. This allows for retroactive identification of power consumption issues, since the power consumption profiling is lightweight enough to run in the background in monitoring mode.

Embodiments may offer an extensibility model, where various device components can be configured to provide useful power consumption data into the collection infrastructure. This facilitates effective debugging of power consumption issues with components by their manufacturers.

Embodiments allow identifying both the existence and magnitude of power consumption issues associated with particular components. This allows the most important power consumption problems to be addressed and resolved with priority.

Figure 6:
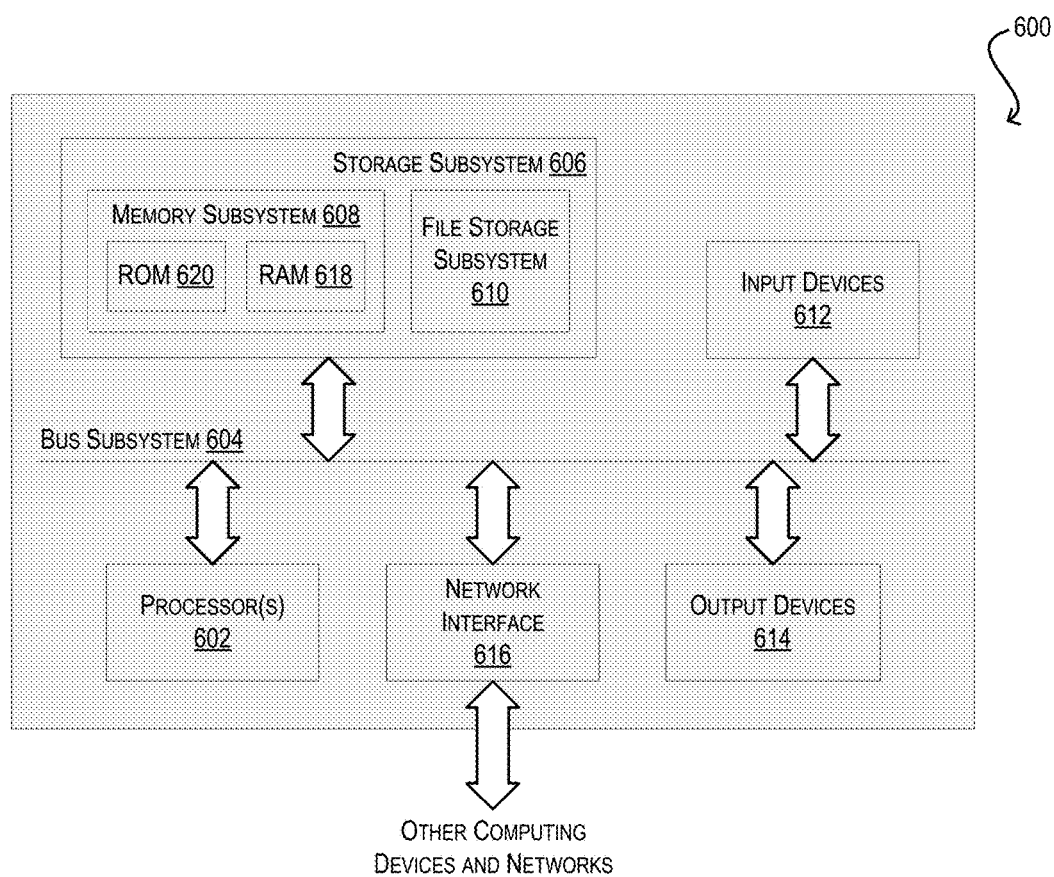
FIG. 6 is a simplified block diagram of a computer system according to an embodiment.

FIG. 6 depicts a simplified block diagram of an example computer system 600 according to certain embodiments. Computer system 600 can be used to implement any of the computing devices, systems, or servers described in the foregoing disclosure. As shown in FIG. 6, computer system 600 includes one or more processors 602 that communicate with a number of peripheral devices via a bus subsystem 604. These peripheral devices include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple busses.

Network interface subsystem 616 can serve as an interface for communicating data between computer system 600 and other computer systems or networks. Embodiments of network interface subsystem 616 can include, e.g., an Ethernet card, a Wi-Fi and/or cellular adapter, a modem (telephone, satellite, cable, ISDN, etc.), digital subscriber line (DSL) units, and/or the like.

User interface input devices 612 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 600.

User interface output devices 614 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 600.

Storage subsystem 606 includes a memory subsystem 608 and a file/disk storage subsystem 610. Subsystems 608 and 610 represent non-transitory computer-readable storage media that can store program code and/or data that provide the functionality of embodiments of the present disclosure.

Memory subsystem 608 includes a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than system 600 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A computer system comprising:
   at least one computing processor; and
   a computer-readable storage medium having stored thereon computer executable instructions which, when executed by the computing processor, cause the computer system to:
   determine a start of a user-interaction session with a device;
   generate a session identifier based upon the start of the user-interaction session;
   broadcast the session identifier for receipt by a power consuming component of the device;
   receive from the power consuming component, aggregated power consumption data including the session identifier;
   store the power consumption data with the session identifier;
   parse the power consumption data according to the session identifier;
   add parsed power consumption data to a power consumption report; and
   communicate the power consumption report for display.

2. The computer system of claim 1 wherein the start of the user-interaction session is determined from a screen of the device turning on.

3. The computer system of claim 2 wherein the screen comprises the power consuming component.

4. The computer system of claim 1 wherein a format of the session identifier triggers the power consuming component to aggregate power consumption data and send the aggregated power consumption data in an extensible manner.

5. The computer system of claim 1 wherein the start of the user-interaction session is determined from a switch between alternating current (AC) and direct current (DC).

6. The computer system of claim 1 wherein the computer executable instructions when executed by the computing processor, further cause the computer system to:
   determine an end of the user-interaction session with the device; and
   in response to the end of the user-interaction session, broadcast a notification for receipt by the power-consuming component.

7. The computer system of claim 6 wherein:
   the start of the user-interaction session is determined from a screen turning on; and
   the end of the user-interaction session is determined from the screen turning off.

8. The computer system of claim 7 wherein the power consuming component comprises the screen.

9. The computer system of claim 1 wherein the power consumption data is stored with the session identifier in a trace buffer.

10. The computer system of claim 9 wherein:
the session engine parses the power consumption data according to the session identifier in response to a command line utility prompt; and
the report comprises HTML.

11. The computer system of claim 1 wherein the computer executable instructions when executed by the computing processor, further cause the computer system to:
communicate the power consumption data to a remote site for analysis with power consumption data of other devices.

12. A method of profiling power consumption by a device, the method comprising:
determining, by the device, a start of a user-interaction session with the device;
generating, by the device, a session identifier based upon the start of the user-interaction session;
broadcasting, by the device, the session identifier for receipt by a power consuming component of the device;
receiving, by the device from the power consuming component, aggregated power consumption data including the session identifier;
determining, by the device, an end of the user-interaction session with the device;
broadcasting, by the device in response to the end of the user-interaction session, a notification for receipt by the power-consuming component;
storing, by the device, the power consumption data with the session identifier;
parsing, by the device, the power consumption data according to the session identifier;
adding, by the device, parsed power consumption data to a power consumption report; and
communicating, by the device, the power consumption report for display, wherein a format of the session identifier triggers the power consuming component to aggregate power consumption data and send the aggregated power consumption data in an extensible manner.

13. The method of claim 12 wherein determining the start of the user-interaction session comprises detecting a screen of the device turning on.

14. The method of claim 12 wherein determining the start of the user-interaction session comprises detecting a switch between alternating current (AC) and direct current (DC).

15. The method of claim 12 wherein:
the power consumption data is parsed according to the session identifier in response to a command line utility; and
the report comprises HTML.

16. The method of claim 12 wherein the power consumption data is stored with the session identifier in a trace buffer.

17. A non-transitory computer-readable storage medium having stored thereon computer executable instructions which, when executed on a computer system, cause the computer system to:
determine a start of a user-interaction session with a device including a power consuming component;
generate a session identifier based upon the start of the user-interaction session;
broadcast the session identifier for receipt by the power consuming component;
determine an end of the user-interaction session with the device;
in response to the end of the user-interaction session, broadcast a notification for receipt by the power-consuming component;
receive from the power consuming component, power consumption data including the session identifier for the user interaction session;
store the power consumption data with the session identifier;
in response to a command line utility, parse the power consumption data according to the session identifier;
add parsed power consumption data to a HTML power consumption report; and
communicate the HTML power consumption report for display.

18. The non-transitory computer-readable storage medium of claim 17 wherein the power consuming component comprises a screen of the device.

19. The non-transitory computer-readable storage medium of claim 17 wherein:
determining the start of the user-interaction session comprises detecting a screen of the device turning on; and
determining the end of the user-interaction session comprises detecting the screen of the device turning off.

20. The non-transitory computer-readable storage medium of claim 17 wherein the computer executable instructions when executed on the computer system, further cause the computer system to:
communicate the power consumption data to a remote site for analysis with power consumption data of other devices.

* * * * *